Patented Oct. 9, 1928.

1,686,529

UNITED STATES PATENT OFFICE.

RHETHERFORD B. MARTIN, OF COLONIA, NEW JERSEY, ASSIGNOR TO MINERALS SEPARATION NORTH AMERICAN CORPORATION, OF NEW YORK, N. Y., A CORPORATION OF MARYLAND.

FROTH-FLOTATION CONCENTRATION OF ORES.

No Drawing.     Application filed December 11, 1926. Serial No. 154,309.

This invention relates to froth-flotation concentration of ores and is herein illustrated as applied to the concentration of zinc ores.

In the concentration of zinc ores by the froth-flotation process it has hitherto been necessary in many cases to effect the froth-flotation in the presence of some copper salt of a mineral acid, such as copper sulphate in the commercial form of blue vitriol. According to the present invention the froth-flotation operation may be conducted in the presence of an organic compound of copper, such as the nitrogen-bearing compound formed when aniline reacts with cupric chloride or when benzidine reacts with cupric chloride, with the result that the zinc in the ore is more effectively concentrated than if the usual copper sulphate had been used. These compounds may be regarded as complex derivatives of ammonia containing a benzene ring. In the following examples the low zinc content of the tailings will be noted.

*Example 1.*—59.1 parts of anhydrous cupric chloride were dissolved in a relatively large amount of cold water and during agitation 40.9 parts aniline oil were added. A dark olive, finely-divided, curd precipitate was formed, partly settling and partly remaining in suspension. The precipitate was filtered and washed with cold water. It may be called aniline copper chloride.

This precipitate was found useful in the froth-flotation concentration of Butte and Superior zinc ore. The suitably ground ore was made into a pulp with water and agitated with 0.1 pounds of pine oil, 0.1 pounds of potassium xanthate, and one pound of the above described aniline copper chloride, all per ton of ore, to yield a mineral-bearing froth. The results are shown in the following table:

|  | Weight | Assay of zinc | Recovery of zinc |
|---|---|---|---|
|  | Per cent | Per cent | Per cent |
| Heads | 100 | 22.7 | 100 |
| Concs | 49.6 | 44.8 | 97.8 |
| Tails | 50.4 | 1 | 2.2 |

*Example 2.*—41.94 parts of anhydrous cupric chloride were dissolved in the minimum quantity of water and stirred into 58.06 parts of aniline, with the evolution of heat. A pasty mass resulted. This was diluted with cold water, filtered and the precipitate washed. It may be called copper di-aniline chloride.

The precipitate was found useful in the froth-flotation concentration of Butte and Superior zinc ore. The suitably ground ore was made into a pulp with water and agitated with 0.1 pounds of pine oil, 0.1 pounds of potassium xanthate, and one pound of the above described copper di-aniline chloride, all per ton of ore, to yield a mineral-bearing froth. The results are shown in the following table:

|  | Weight | Assays of zinc | Recovery of zinc |
|---|---|---|---|
|  | Per cent | Per cent | Per cent |
| Heads | 100 | 22.6 | 100 |
| Concs | 54.3 | 41.5 | 99.2 |
| Tails | 45.7 | 0.37 | 0.8 |

*Example 3.*—Aniline hydrochloride and anhydrous cupric chloride were separately dissolved in aqueous hydrochloric acid and the solution mixed, so that the ultimate mixture consisted of 8.8 parts of aniline hydrochloride, and 24.5 parts cupric chloride, and 66.7 parts of the hydrochloric acid. The cupric chloride was used in large excess. The product was a dark yellowish brown, finely crystalline precipitate which was washed with hydrochloric acid and dried. It may be called cupric chloride aniline hydrochloride.

The precipitate was found useful in the froth-flotation concentration of Butte and Superior zinc ore. The suitably ground ore was made into a pulp with water and agitated with 0.1 pounds of pine oil, 0.1 pounds of potassium xanthate, and one pound of the above described cupric chloride aniline hydrochloride, all per ton of ore, to yield a mineral-bearing froth. The results are shown in the following table:

|  | Weight | Assays of zinc | Recovery of zinc |
|---|---|---|---|
|  | Per cent | Per cent | Per cent |
| Heads | 100 | 22.6 | 100 |
| Concs | 54.6 | 40.3 | 97.4 |
| Tails | 45.4 | 1.3 | 2.6 |

*Example 4.*—47.3 parts of aniline were dissolved in an excess of aqueous hydrochloric acid, and 34.3 parts of cupric chloride were separately dissolved in an excess of aqueous hydrochloric acid. The solutions were mixed and cooled when a crystalline canary yellow precipitate separated out. This was filtered off and washed with hydrochloric acid and found to be slightly soluble in water. It could be called cupric chloride di-aniline hydrochloride.

The precipitate was found useful in the froth-flotation concentration of Butte and Superior zinc ore. The suitably ground ore was made into a pulp with water and agitated with 0.1 pounds of pine oil, 0.1 pounds of potassium xanthate, and one pound of the above described cupric chloride di-aniline hydrochloride, all per ton of ore, to yield a mineral-bearing froth. The results are shown in the following table.

|  | Weight | Assays of zinc | Recovery of zinc |
|---|---|---|---|
|  | Per cent | Per cent | Per cent |
| Heads | 100 | 21.5 | 100 |
| Concs | 52.6 | 40.4 | 99. |
| Tails | 47.4 | 0.47 | 1.0 |

*Example 5.*—57.8 parts of benzidine and 42.2 parts of cupric chloride were separately dissolved in alcohol and mixed, yielding a brownish black curd precipitate, slightly soluble in water. The precipitate may be called benzidine cupric chloride.

The precipitate was found useful in the froth-flotation concentration of Butte and Superior ore. The suitably ground ore was made into a pulp with water and agitated with 0.1 pounds of pine oil, 0.1 pounds of potassium xanthate, and one pound of the above described benzidine cupric chloride all per ton of ore, to yield a mineral-bearing froth. The results are shown in the following table.

|  | Weight | Assays of zinc | Recovery of zinc |
|---|---|---|---|
|  | Per cent | Per cent | Per cent |
| Heads | 100 | 19.4 | 100 |
| Concs | 46.7 | 40.4 | 97.3 |
| Tails | 53.3 | 1.0 | 2.7 |

*Example 6.*—51.8 parts of benzidine dissolved in alcohol were mixed with an excess of hydrochloric acid and the cupric chloride was dissolved in an excess of hydrochloric acid, yielding a canary yellow curd precipitate soluble in water. The precipitate may be called benzidine hydrochloride cupric chloride.

The precipitate was found useful in the froth-flotation concentration of Butte and Superior ore. The suitably ground ore was made into a pulp with water and agitated with 0.1 pounds of pine oil, 0.1 pounds of potassium xanthate, and one pound of the above described benzidine hydrochloride cupric chloride, all per ton of ore, to yield a mineral-bearing froth. The results are shown in the following table.

|  | Weight | Assays of zinc | Recovery of zinc |
|---|---|---|---|
|  | Per cent | Per cent | Per cent |
| Heads | 100 | 18.9 | 100 |
| Concs | 46.8 | 39.9 | 98.4 |
| Tails | 53.2 | 0.4 | 1.1 |

The aniline and benzidine compounds used in the foregoing examples were found by analysis to be almost pure compounds of their respective types.

It has been found that the use of such substances may make the use of xanthate unnecessary to obtain tailings low in zinc in concentrating some ores. A lead zinc middling of St. Joe ore containing about 10% each of lead and zinc was agitated with suitable reagents to yield a lead froth which was separated. It was then further agitated with pine oil 0.15 pounds per ton and water gas tar 0.2 to 0.3 pounds per ton and one pound per ton of cupric chloride di-aniline hydrochloride prepared as described in Example 4 above. There was obtained in several tests a zinc concentrate varying from 38.4% to 48.8% zinc content, with a tailing of about 1% zinc.

The cupric chloride di-aniline hydrochloride in other tests yielded a concentrate with Butte and Superior zinc ore leaving a lower tailing than in the above examples.

Having thus described certain embodiments of my invention, what I claim is:

1. The process of concentrating a sulphide ore which consists in agitating a pulp of the suitably ground material with a mineral-frothing agent and with an organic compound carrying nitrogen and copper and capable of assisting in the flotation of a mineral value of the ore so as to produce a mineral-bearing froth, and separating the froth carrying said value.

2. The process of concentrating a sulphide ore which consists in agitating a pulp of the suitably ground material with a mineral-frothing agent and with a copper derivative of ammonia capable of assisting in the flotation of a mineral value of the ore so as to produce a mineral-bearing froth carrying said value, and separating the froth.

3. The process of concentrating a sulphide ore which consists in agitating a pulp of the suitably ground material with a mineral-frothing agent and with a copper derivative of ammonia containing a benzene ring and capable of assisting in the flotation of a mineral value of the ore so as to produce a mineral-bearing froth carrying said value, and separating the froth.

4. The process of concentrating a sulphide ore which consists in agitating a pulp of the suitably ground material with an organic compound of copper containing a benzene ring and capable of assisting in the flotation of a mineral value of the ore so as to produce a mineral-bearing froth carrying said value, and separating the froth.

5. The process of concentrating a zinc ore which consists in agitating a pulp of the suitably ground material with an organic compound carrying nitrogen and copper and capable of assisting in the flotation of the zinc so as to produce a mineral-bearing froth carrying zinc, and separating the froth.

6. The process of concentrating a zinc ore which consists in agitating a pulp of the suitably ground material with a copper derivative of ammonia containing a benzene ring and capable of assisting in the flotation of the zinc so as to produce a mineral-bearing froth carrying zinc, and separating the froth.

7. The process of concentrating a zinc ore which consists in agitating a pulp of the suitably ground material with a double compound of a copper salt and aniline capable of assisting in the flotation of the zinc so as to produce a mineral-bearing froth carrying zinc, and separating the froth.

8. The process of concentrating a lead-zinc ore which consists in agitating a pulp of the suitably ground material with a mineral-frothing agent so as to produce a mineral-bearing froth relatively rich in lead and relatively poor in zinc, separating the froth, further agitating the pulp with the addition of an organic compound carrying copper and capable of assisting in the flotation of the zinc so as to produce a second mineral-bearing froth relatively rich in zinc, and separating the second froth.

9. The process of concentrating a lead-zinc ore which consists in agitating a pulp of the suitably ground material with a mineral-frothing agent so as to produce a mineral-bearing froth relatively rich in lead and relatively poor in zinc, separating the froth, further agitating the pulp with the addition of an organic compound carrying nitrogen and copper and capable of assisting in the flotation of the zinc to produce a second mineral-bearing froth relatively rich in zinc, and separating the second froth.

10. The process of concentrating a lead-zinc ore which consists in agitating a pulp of the suitably ground material with a mineral-frothing agent so as to produce a mineral-bearing froth relatively rich in lead and relatively poor in zinc, separating the froth, further agitating the pulp with the addition of a copper derivative of ammonia containing a benzene ring and capable of assisting in the flotation of the zinc so as to produce a mineral-bearing froth relatively rich in zinc, and separating the froth.

11. The process of concentrating a lead-zinc ore which consists in agitating a pulp of the suitably ground material with a mineral-frothing agent so as to produce a mineral-bearing froth relatively rich in lead and relatively poor in zinc, separating the froth, further agitating the pulp with a double compound of a copper salt and aniline and capable of assisting in the flotation of the zinc so as to produce a mineral-bearing froth relatively rich in zinc, and separating the froth.

In testimony whereof, I have affixed my signature to this specification.

RHETHERFORD B. MARTIN.